United States Patent [19]

Jasperson et al.

[11] 3,724,079
[45] Apr. 3, 1973

[54] NAVIGATIONAL CHART DISPLAY DEVICE

[75] Inventors: Robert E. Jasperson; Mitchell Arthur Kapland, both of Annapolis, Md.

[73] Assignee: Trident Engineering Associates, Inc., Annapolis, Md.

[22] Filed: Sept. 23, 1970

[21] Appl. No.: 74,702

[52] U.S. Cl.....................................33/1 SD, 353/12
[51] Int. Cl..............................................G03b 21/00
[58] Field of Search ............33/1 SD; 235/88; 353/12

[56] References Cited

UNITED STATES PATENTS

| | | |
|---|---|---|
| 3,373,493 | 3/1968 | McDonald.........................33/1 SD |
| 2,407,893 | 9/1946 | Meyer................................33/1 SD |
| 2,114,652 | 4/1938 | Dalton................................33/1 SD |
| 509,891 | 12/1893 | Gore........................................235/88 |
| 2,631,391 | 3/1953 | Hanna....................................235/88 |
| 2,007,986 | 7/1935 | Sprague............................33/1 SD |

*Primary Examiner*—William D. Martin, Jr.
*Attorney*—Michael Ebert

[57] ABSTRACT

A navigational chart display device which is adapted to enable a pilot to fix his position, to plot courses and to measure distances. The device is constituted by a stationary board having printed within a circular zone on the face thereof a Mercator projection of a selected region, the zone being encircled by a true compass rose. Within the true compass rose and concentric therewith is a magnetic variation rose. Superposed on the chart board is a transparent writing panel, and sandwiched therebetween is a transparent disc which is pivotally mounted for rotation about the zone center of the chart. The disc is provided with orthagonally-crossed diameter lines ruled thereon, which lines terminate in pointers and are adapted to indicate angular positions with respect to the true compass rose, the disc also having an array of equispaced grid lines ruled thereon in parallel relation to one of the diameter lines. The grid lines on the rotatable disc serve to plot bearings, lay off courses, plot latitude and longitude coordinates and to measure distances, these procedures being carried out by drawing erasable lines on the writing board.

3 Claims, 8 Drawing Figures

INVENTORS
ROBERT E. JASPERSON
MITCHELL ARTHUR KAPLAND

ATTORNEY

INVENTORS
ROBERT E. JASPERSON
BY MITCHELL ARTHUR KAPLAND

ATTORNEY

NAVIGATIONAL CHART DISPLAY DEVICE

BACKGROUND OF THE INVENTION

This invention relates generally to navigational instruments, and more particularly to a chart display device to enable a pilot to fix his position, to plot courses and to measure distances.

While a chart display device in accordance with the invention is applicable to both air and marine navigation, it will, by way of illustration, be described in connection with marine navigation which deals with procedures used to determine the position and to direct the course of a vessel. In piloting a vessel, positional information is obtained in a variety of ways. Landmarks, beacons and lights are used for taking bearings by compass or as ranges along which to proceed. Among the electronic aids to navigation is the radio direction-finding compass which is simply a shipboard receiver with a directional antenna that indicates the direction of a transmitting aerial located at a known position.

Essential to navigation is the chart, which is a graphic representation of a body of water, capable of being interpreted within the limits of safe piloting and navigation. In the Mercator projection chart, the curving meridians that meet at the poles of the actual earth are opened up at the poles to form parallel lines, so that lines of constant compass direction are shown as straight lines.

It is well known that the storage and display of charts presents a major practical problem to the navigator, especially on pleasure-craft where space is at a premium. It is an axiom in the nautical world that a chart should never be folded or creased, for with repeated handling, certain features or words appearing along the fold lines may be obliterated. Nevertheless, in small craft with limited space, it is the practice to fold large charts or to mount them on rollers in strip form for convenient display. But these devices are cumbersome and hard to manipulate. Charts are also available in accordian-pleated form for compact storage, but these are difficult to spread out and to identify quickly.

In plotting courses and lines of position on a chart, straight-edge instruments are required which are capable of transferring a course to the compass roses on the chart. For this purpose, transparent parallel rules are often used, which serve also to advance a line of position along a course for a running fix. Alternatively, one may use a one-arm course protractor. Also ordinarily required in conjunction with a chart is a pair of dividers for stepping off distances. These instruments are difficult to manipulate in the very limited space available on a small pleasure-craft or vessel.

SUMMARY OF THE INVENTION

In view of the foregoing, it is the main object of this invention to provide a simple and easily-operated chart-display device adapted to facilitate marine and aircraft navigation.

Among the advantages of a display device in accordance with the invention are the following:

A. It requires a minimum of effort to operate;
B. It occupies relatively little space and is therefore particularly suitable for small craft, including aircraft. However, models of larger scale and with a greater degree of precision and sophistication may be designed employing the basic principles of the present invention for professional use on large vessels, freighters and airliners;
C. It enables a pilot to plot accurate bearings and courses more rapidly than with conventional dividers or rulers, and lessens the probability of error.

Also an object of the invention is to provide a display device of the above type in which the chart is optically projected and enlarged.

Briefly stated, in one embodiment of the invention, the display device is constituted by a stationary chart board having printed within a circular zone on the face thereof a Mercator projection of a selected region, the board having latitude and longitude scales thereon along its edges. The zone on the chart is encircled by a true compass rose and concentric therewith is a magnetic variation rose. Superposed on the chart board is a transparent writing panel and sandwiched therebetween is a transparent disc which is mounted for rotation about the center of the chart zone. The disc is ruled with orthagonal diameter lines terminating in pointers adapted to indicate angular positions along the scale of the true compass rose. Also ruled on the disc is an array of equi-spaced grid lines parallel to one of the diameter lines, which grid lines serve to plot bearings, lay off courses, plot latitude and longitude coordinates, and to measure distances, these procedures being carried out by drawing erasable lines on the writing panel.

OUTLINE OF THE DRAWING

For a better understanding of the invention, as well as other objects and further features thereof, reference is made to the following detailed description to be read in conjunction with the accompanying drawing, wherein.

Figure 3:
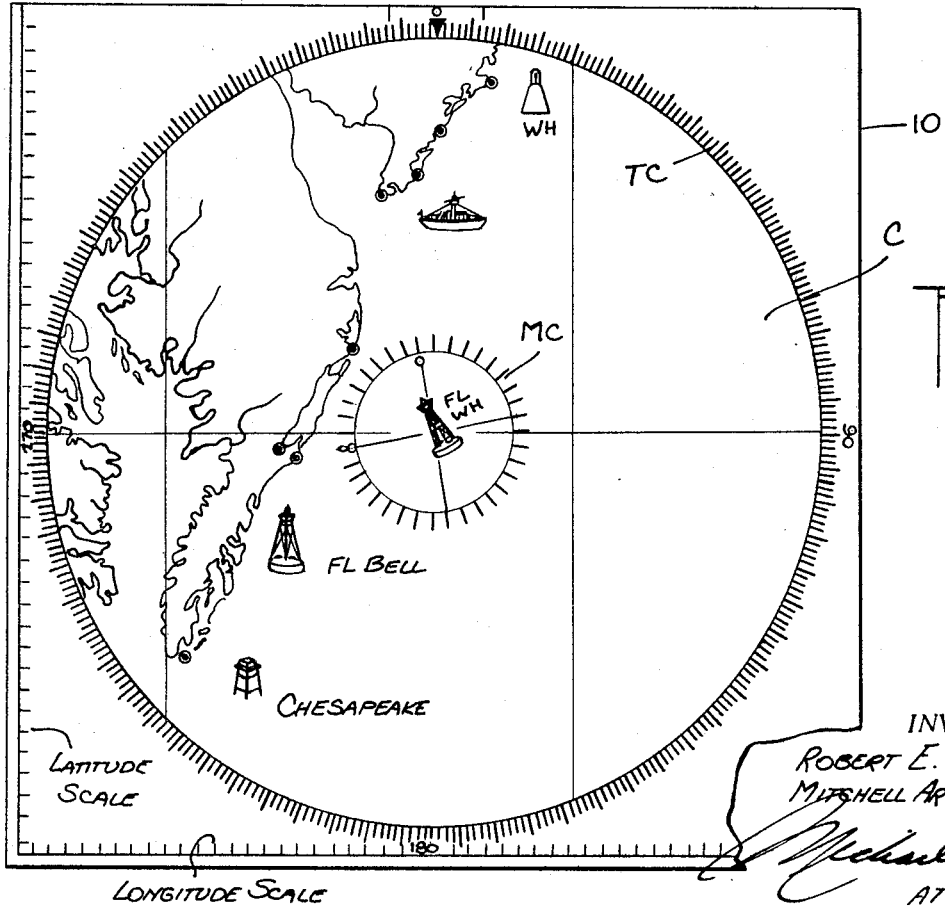
Figure 4:
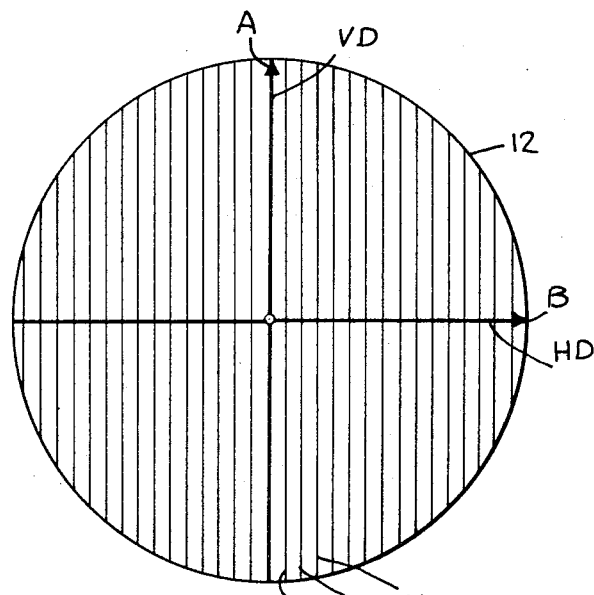
Figure 5:
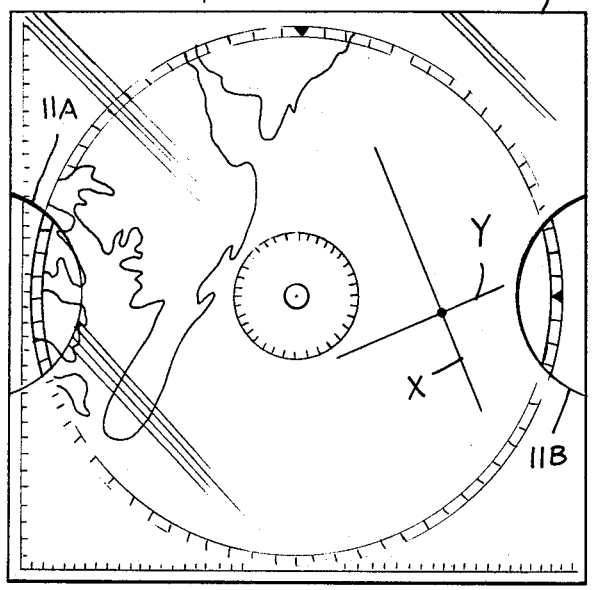
Figure 6:
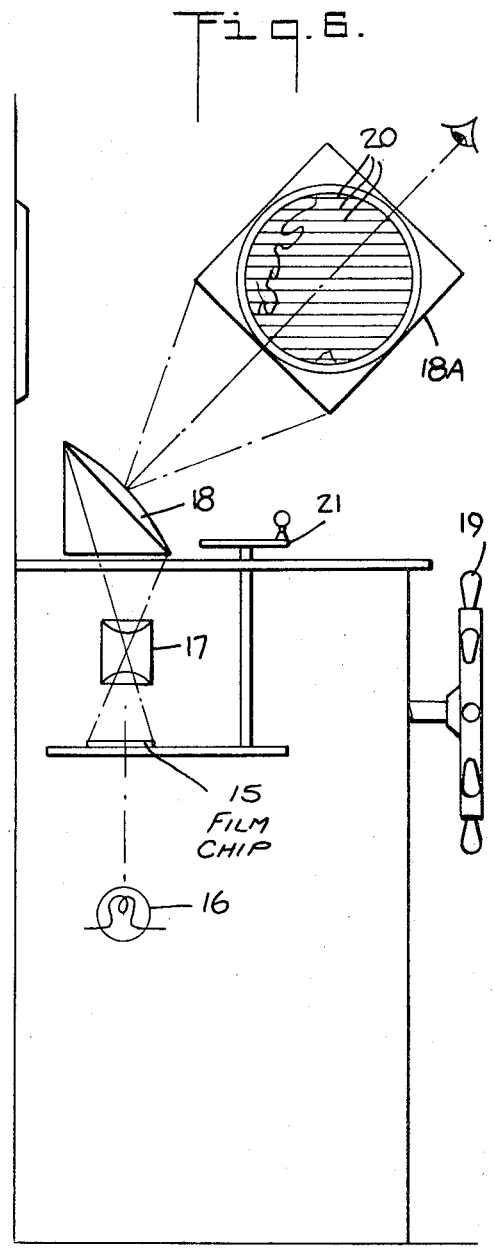
Figure 2:
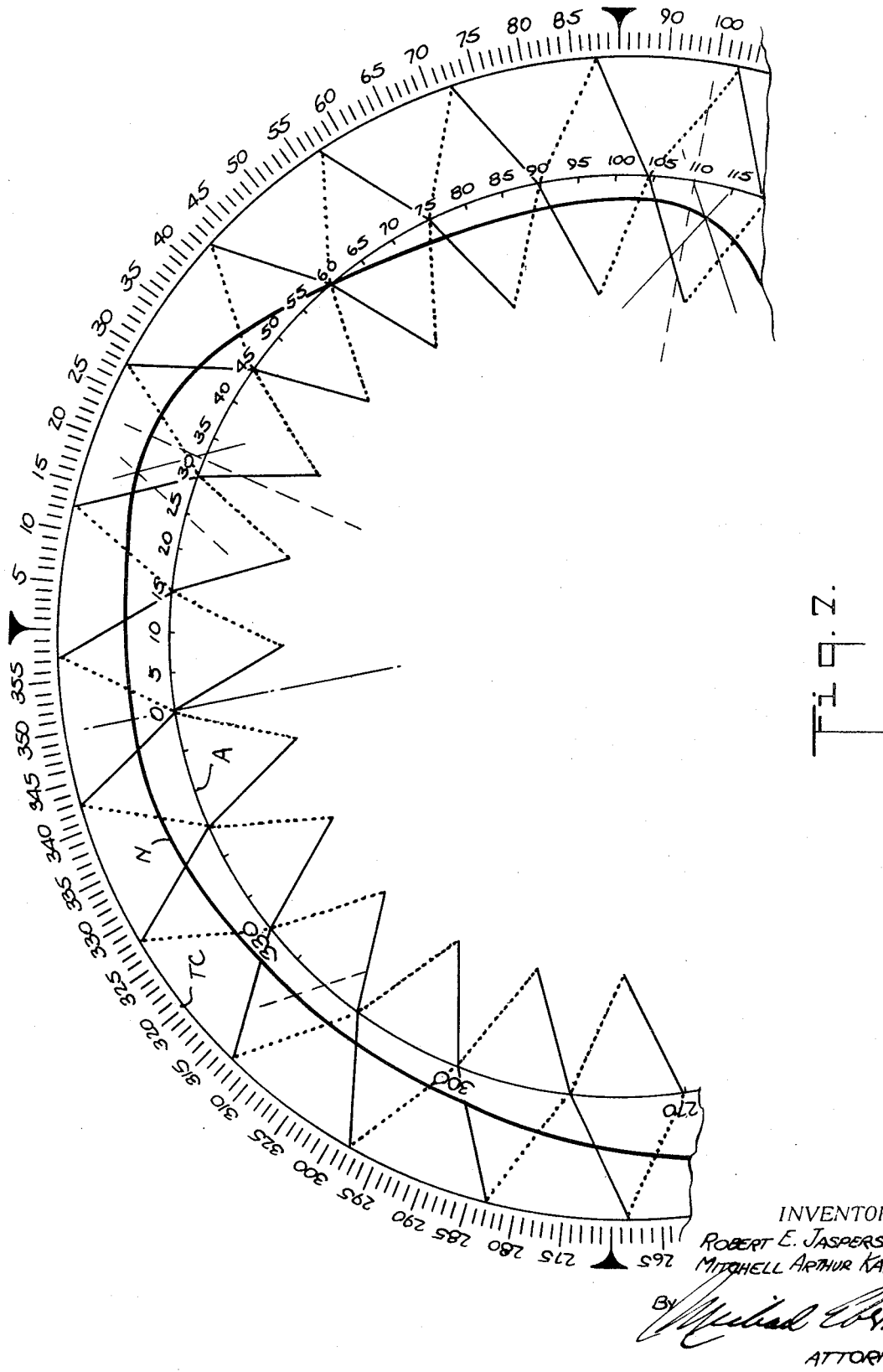
Figure 8:
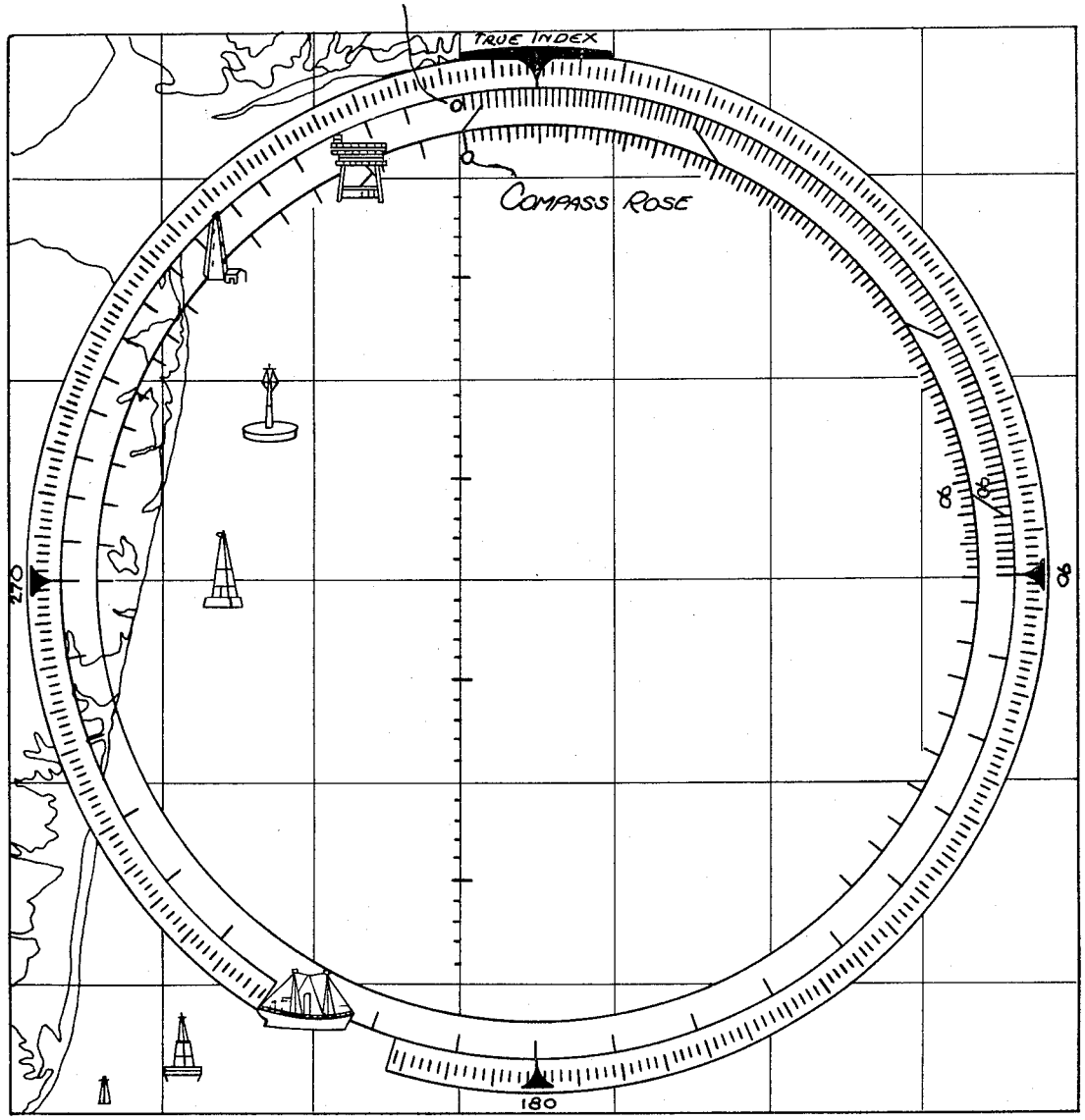

FIG. 3 separately shows the chart board of the device;

FIG. 4 separately shows the rotating grid disc;

FIG. 5 separately shows the writing panel;

FIG. 6 schematically shows a projection-type display device according to the invention;

FIG. 7 is a circular scale in accordance with the invention by which one may convert a course or bearing from compass to magnetic to true, or from true to magnetic to compass, and FIG. 8 is a modified form of converter.

DESCRIPTION OF DIRECT VIEWING DISPLAY DEVICE

Figure 1:
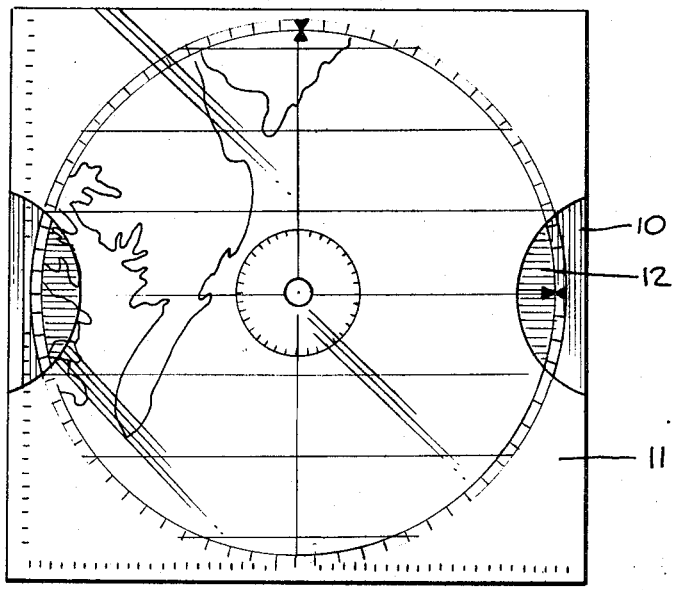
FIG. 1 is a plan view of a navigational chart-display device in accordance with one embodiment of the invention.
Figure 2:
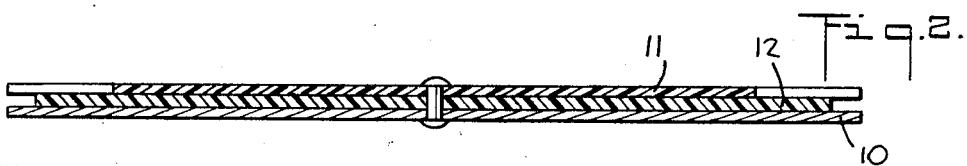
FIG. 2 is a section taken through the center of the device.

Referring now to the drawings, and more particularly to FIG. 1, there is shown a chart display device in accordance with the invention, the device comprising three components; namely, a reversible chart board 10 which is square-shaped, a similarly-shaped clear writing panel 11 superposed on board 10, and a rotatable grid disc 12 of transparent material interposed between board 10 and panel 11.

Chart board 10 has printed on both faces thereof a Mercator projection of an area to be navigated, the boundary of the area being circular to define a chart zone C. By way of example, the chart separately shown in FIG. 3 is of a coastal region including Delaware Bay and Chesapeake Bay. Shorelines and landmarks are represented by standard lines and shadings, and approaches, harbors, rocks and the like are indicated by conventional coastal abbreviations in the usual manner.

The most commonly used landmarks are shown on the chart as a circle with a dot in the center and are appropriately labeled, such as CG for coast guard, FP for flagpole, TR for tower, and Sta for signal station. Navigational lights are shown as solid red discs with a black dot in the center, and light vessels are indicated by the outline of a hull with a single mast bearing crossed lines at the top.

The location of radio beacons is shown by a dot in the center of a small circle surrounded by a magenta circle and the letters RBn. These are the regular marine beacons transmitting signals for taking bearings with a radio direction-finder. To simplify the showing, depth indications and many other symbols, abbreviations and other data normally found on nautical charts are omitted from the figures.

On the edges of chart board 10 are latitude and longitude scales. A true compass rose TC showing the true direction in degrees is printed about the periphery of the circular chart zone C. Inside the true circle and concentric therewith is another circular scale MC calibrated in compass points to show the amount of magnetic variation at the time the chart was printed. Inside the inner scale MC is a notation showing the amount of variation in degrees and minutes to be added or subtracted.

In practice, each chart board may have two charts printed thereon, back-to-back, the connecting pivot for the three components of the display device being removable to permit reversal of the chart board or the replacement of one preprinted chart board by another. One may provide a compact library or chest containing a plurality of chart boards which together cover a large geographic area, such as the entire east coast of the United States or any other region. The grid disc 12 is mounted for rotation at the exact zonal center of chart board 10. Disc 12, as best seen in FIG. 4, has a vertical diameter line VD terminating in a pointer A ruled thereon, this line being intersected by a horizontal diameter line HD terminating in a pointer B. Ruled at equispaced positions parallel to the vertical diameter line are vertical lines $V_1$, $V_2$, $V_3$, etc., which together define a grid. These grid lines do not represent meridians of longitude, but are merely for purposes of reference. The diameter of disc 12 is such that pointers A and B adjoin the circular inner edge of compass rose TC on the chart, so that as the disc is rotated, one may align the pointers with any angular position on the compass rose.

Writing panel 11 is provided with arcuate notches 11A and 11B on opposing sides thereof to permit the user to manipulate the disc thereunder. The panel is made of acrylic, vinyl or other clear plastic material that will accept the writing of a grease pencil or of any other writing tool adapted to produce temporary lines which may be readily erased after use.

The parallel lines on the rotatable grid disc make it possible to plot bearings, lay off courses, plot latitude or longitude coordinates, and to measure distances. These operations will now be illustrated by the following examples.

To plot lines of position of a vessel off the Virginia Capes proceeding to New York and having the chart C available, the pilot, at 1015, obtains bearings as follows:

Delaware Light Vessel: 338.5° true
Chesapeake Light Station: 257° true

The grid disc is first rotated until pointer A coincides with 338.5° true and a line X is drawn on the writing panel through Delaware Light Vessel parallel to the grid lines, as shown in FIG. 5. This may be done freehand or with the aid of a straightedge. Pointer A is then shifted to 257° true and a line Y is drawn on the writing panel 11 from Chesapeake Light Station parallel to the grid lines. The intersection of lines X and Y is the 1015 fix.

```
Latitude           37° – 12'0 N
Longitude 73° – 58'0 W
Distance           85 miles
```

In taking bearings, any available equipment may be used for this purpose, such as pelorus, when there is good visibility, or a radio direction-finder for taking bearings over distances beyond the range of visibility or when the weather thickens.

To plot a course between two points, we shall, by way of example, now proceed from the 1015 fix (Lat. 37° – 12'0 N; Long. 73° – 58'0 W) to the Five Fathom Bank Light Vessel. The grid disc is now rotated until the 1015 fix and the Five Fathom Bank Light Vessel are aligned with respect to the parallel lines of the grid, making it possible to read the course, viz., 344° true and 354° magnetic.

In a like manner, the course between any two points on the chart is found merely by rotating the grid until the two points are in alignment with a vertical line on the grid, and then reading the course in the compass roses, true or magnetic.

In measuring distances, one must bear in mind that on a Mercator projection, a minute of latitude is equal to one nautical mile (6,080 feet). Hence the latitude scale becomes a distance scale. In the display device, the spacing between grid lines is purely arbitrary and remains fixed. The relationship between grid spacing and parallels of latitude for any given chart is found by rotating the grid until pointer B coincides with the true index in the compass rose TC. In the present example, 20 grid spaces corresponds to 120 arc minutes, based on mid-latitude 38°; hence one graduation equals 6 miles.

To measure distance from the fix to Five Fathom Bank Light Vessel, pointer B is rotated to 344° T. The number of grid lines between the points is counted (17.5). Pointer B is then rotated to 0° and the 17.5 spaces is related to minutes of latitude to determine distance (17.5 = 105' 105 miles).

DESCRIPTION OF PROJECTION-TYPE DISPLAY DEVICE

Referring now to FIG. 6, there is shown a projection-type display device in accordance with the invention. In this device, the charts to be examined appear in reduced scale on film chips 15 made for example from 35 mm color transparencies mounted in conventional photographic 33 mm frames. These chips are illuminated by a suitable lamp 16 and are projected by a lens system 17 onto the ground glass lens 18 of a circular viewing screen which is preferably positioned directly before the helmsman operating the steering wheel 19 of the vessel.

Screen 18, as shown in the presentation 18A, has vertical grid lines 20 ruled thereon, the screen being rotatable by a control mechanism including handle 21 so that the screen operates in a manner equivalent to the grid disc shown in FIG. 1. Alternatively, the screen may be stationary whereas the holder 22 for the film chips may be made rotatable to accomplish the same purpose, for then the chart would be rotated relative to the grid lines. In the latter procedure, the course direction, as seen on the chart, would coincide with compass direction. That is, if the vessel is travelling south, it would appear to be south, for directions would be from the upper portion of the screen to the lower portion, whereas easterly would appear from left to right, and so on.

In the procedure in which the film chip is stationary, but the screen is rotatable, the chart will always be positioned with the northern portion at the top. Therefore a southerly course would read out the proper southerly degrees, while the chart would always appears to be northerly. In practice, the slide holder may be automatically oriented to true or magnetic north by means of a conventional compass repeater or servo system.

The chips may be placed in view and illuminated either manually or automatically on demand by means of mechanisms commonly used in commercially available slide projectors. Thus a multiplicity of chips may be presented in sequence or as desired. Alternatively the charts may be carried along the frame of a film strip borne on a reel contained in a replaceable cassette.

NAPIER CONVERTER

The procedure for converting a course or bearing from compass to magnetic to true, or from true to magnetic to compass, has troubled mariners for years and has frequently led to accidents or disaster. The conventional procedure for this purpose makes use of a Napier diagram which, when prepared for any magnetic compass, enables a user to find the deviation for any heading, compass or magnetic, and to obtain the magnetic course corresponding to a compass course, or vice versa, by drawing one or two short lines.

In a conventional Napier diagram, the central dotted line is provided with a numerical scale whose numerals represent every fifth degree of a compass card cut at the north point and straightened into a vertical line. The diagram is arranged in two halves, the left half having degrees from 0° north to 180° south, and the right half from 180° south to 360° north. The Napier curve is drawn with respect to the axis represented by the central vertical line to indicate the deviation west and east relative thereto.

In order to simplify the procedures involved in reading a Napier diagram, there is provided, as shown in FIG. 7, a transparency in the form of a circular disc or an arcuate portion thereof containing a curve of deviation based on a Napier diagram, the curve being represented by the heavy line N which undulates with respect to the dotted arc A providing the axis having indicia in 5° increments. The Napier curve indicates the deviation to the West and East. The Napier transparency is placed over the chart in accordance with the invention in registration with the true compass scale TC.

The following are examples of how the Napier converter is used:

Example A: Given a radio direction-finder (RDF) bearing per steering compass (p.s.c.) 025°, project an imaginary line through 25 and parallel with the dotted line A forming the parallelogram which encompasses 25 to the Napier deviation curve N. From this intersection, project an imaginary plain line back to compass rose TC parallel with its nearest plain line. Read magnetic bearing 032°. Then align the rotatable grid of the display device with 032° magnetic, and read true bearing 022° on the True Index.

Example B:

| | |
|---|---|
| Compass Bearing | 115° |
| Deviation | 5°W |
| Magnetic Bearing | 110° |
| Variation | 10°W |
| True Bearing | 100° |

Example C:

| | |
|---|---|
| Compass Bearing | 320° |
| Deviation | 3°W |
| Magnetic Bearing | 323° |
| Variation | 10°W |
| True Bearing | 313° |

In FIG. 8, a modification is shown in which, having constructed a deviation curve on a Napier diagram, compass points are joined to the corresponding magnetic points by a straight line. If the deviation is zero on any compass heading, no line is drawn.

EXAMPLES

| Compass | Deviation | Magnetic |
|---|---|---|
| 0° | 3°E | 3° |
| 35° | 5°W | 30° |
| 65° | 5°E | 70° |
| 90° | 3°E | 93° |

While there have been shown and described preferred embodiments of chart display device in accordance with the invention, it will be appreciated that many changes and modifications may be made therein without, however, departing from the spirit of the invention.

We claim:

1. A chart display device enabling a navigator to fix his position, to plot courses and to measure distances, the device comprising:
   A. a stationary board having printed thereon within a circular central zone a Mercator projection of a selected region to be navigated, the zone being encircled by a true compass rose hav concentrically disposed therein a magnetic variation rose, said board having a longitude scale and a latitude scale along respective edges thereof;

B. a transparent stationary writing panel superposed on said board and having matching dimensions, said panel being formed of a plastic material which accepts the erasable writing of a grease pencil, and
C. a manually rotatable transparent disc interposed between said board and said panel and pivoted for rotation about the center of said zone, said disc having parallel lines ruled thereon to define a grid and having two orthogonally-crossed diameter lines terminating in pointers which adjoin the scale of said compass rose.

2. A device as set forth in claim 1, including removable means to pivot said disc to said board whereby said board may be replaced by a second board containing another chart.

3. A device as set forth in claim 2, wherein said board contains a chart on the opposite face thereof and is reversible with respect to said disc.

* * * * *